United States Patent
Jones et al.

(10) Patent No.: US 8,752,293 B2
(45) Date of Patent: Jun. 17, 2014

(54) METHOD OF FABRICATING STRUCTURES USING COMPOSITE MODULES AND STRUCTURES MADE THEREBY

(75) Inventors: Darrell D. Jones, Mill Creek, WA (US); Arvid J. Berg, Seattle, WA (US); Joseph D. Brennan, San Diego, CA (US); Travis J. Sherwood, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/200,882

(22) Filed: Aug. 28, 2008

(65) Prior Publication Data

US 2009/0148647 A1  Jun. 11, 2009

Related U.S. Application Data

(63) Continuation-in-part of application No. 11/952,222, filed on Dec. 7, 2007.

(51) Int. Cl.
  *B29C 65/00* (2006.01)
  *B31B 1/60* (2006.01)
  *B32B 37/00* (2006.01)
  *B64C 1/00* (2006.01)

(52) U.S. Cl.
  USPC ............ 29/897.2; 29/445; 156/600; 156/196; 156/304.5; 156/391; 244/120; 264/257; 264/510; 428/58

(58) Field of Classification Search
  USPC ............ 29/897.2, 428; 156/60, 99, 123, 157, 156/159, 196, 217, 242, 245, 250, 256, 391, 156/516, 517, 523, 573; 244/117 R, 119, 244/120; 428/58, 138, 139, 57, 60, 62, 113; 442/189, 409; 264/257, 258, 510, 512
  See application file for complete search history.

(56) References Cited

U.S. PATENT DOCUMENTS

| | | | |
|---|---|---|---|
| 2,374,894 A | | 5/1945 | Scarlett et al. |
| 2,679,278 A | | 5/1954 | Clark |
| 3,101,290 A | * | 8/1963 | Paul .............................. 156/137 |
| 3,739,166 A | | 6/1973 | Anderson |
| 3,983,282 A | | 9/1976 | Seemann, III |
| 4,015,035 A | * | 3/1977 | Blad et al. ........................ 428/60 |
| 4,016,022 A | | 4/1977 | Browning et al. |
| 4,049,484 A | | 9/1977 | Priest et al. |
| 4,120,632 A | | 10/1978 | Stoeberl |
| 4,132,755 A | | 1/1979 | Johnson |

(Continued)

FOREIGN PATENT DOCUMENTS

| | | |
|---|---|---|
| DE | 102004046520 A1 | 4/2005 |
| EP | 0230682 A2 | 8/1987 |

(Continued)

OTHER PUBLICATIONS

USPTO Office Action dated Jun. 2, 2010 for U.S. Appl. No. 11/751,931, pp. 15.

(Continued)

*Primary Examiner* — Alexander P Taousakis
(74) *Attorney, Agent, or Firm* — Yee & Associates, P.C.

(57) ABSTRACT

A large scale composite structure is fabricated by forming a plurality of composite laminate modules and joining the modules together along their edges using scarf joints.

20 Claims, 11 Drawing Sheets

(56) References Cited

U.S. PATENT DOCUMENTS

| | | | |
|---|---|---|---|
| 4,208,238 A | 6/1980 | August et al. | |
| 4,238,539 A | 12/1980 | Yates et al. | |
| 4,287,015 A | 9/1981 | Danner, Jr. | |
| 4,476,797 A | 10/1984 | Ivanov et al. | |
| 4,491,081 A | 1/1985 | Ivanov | |
| 4,491,493 A | 1/1985 | Eaton | |
| 4,496,412 A | 1/1985 | Ritter | |
| 4,548,859 A | 10/1985 | Kline et al. | |
| 4,554,036 A | 11/1985 | Newsom | |
| 4,564,543 A | 1/1986 | Ritter | |
| 4,588,626 A | 5/1986 | Cologna | |
| 4,622,091 A | 11/1986 | Letterman | |
| 4,698,115 A | 10/1987 | Dodds | |
| 4,741,943 A * | 5/1988 | Hunt | 428/113 |
| 4,824,513 A | 4/1989 | Dodds | |
| 4,875,962 A | 10/1989 | Breakspear | |
| 4,902,215 A | 2/1990 | Seemann, III | |
| 4,917,353 A | 4/1990 | Riley | |
| 4,934,199 A | 6/1990 | Avila et al. | |
| 4,942,013 A | 7/1990 | Palmer et al. | |
| 4,945,488 A | 7/1990 | Carver et al. | |
| 4,961,799 A | 10/1990 | Cologna | |
| 4,987,700 A * | 1/1991 | Westerman et al. | 451/152 |
| 5,033,014 A | 7/1991 | Carver et al. | |
| 5,034,254 A | 7/1991 | Cologna | |
| 5,052,906 A | 10/1991 | Seemann | |
| 5,071,338 A * | 12/1991 | Dublinski et al. | 425/403 |
| 5,087,193 A | 2/1992 | Herbert, Jr. | |
| 5,116,216 A | 5/1992 | Cochran et al. | |
| 5,123,985 A | 6/1992 | Evans et al. | |
| 5,129,813 A | 7/1992 | Shepherd | |
| 5,167,742 A * | 12/1992 | Peters | 156/175 |
| 5,180,046 A | 1/1993 | Hutton et al. | |
| 5,190,611 A | 3/1993 | Cologna | |
| 5,207,541 A | 5/1993 | Westerman | |
| 5,217,669 A * | 6/1993 | Dublinski et al. | 264/258 |
| 5,290,386 A | 3/1994 | Trudeau | |
| 5,316,462 A | 5/1994 | Seemann | |
| 5,350,614 A * | 9/1994 | Chase et al. | 428/53 |
| 5,359,887 A | 11/1994 | Schwab et al. | |
| 5,364,584 A | 11/1994 | Imanara et al. | |
| 5,427,518 A | 6/1995 | Morizot et al. | |
| 5,427,725 A | 6/1995 | White et al. | |
| 5,429,326 A * | 7/1995 | Garesche et al. | 244/133 |
| 5,439,635 A | 8/1995 | Seemann | |
| 5,441,692 A | 8/1995 | Taricco | |
| 5,514,232 A | 5/1996 | Burns | |
| 5,576,030 A | 11/1996 | Hooper | |
| 5,601,852 A | 2/1997 | Seemann | |
| 5,612,492 A | 3/1997 | Schwab et al. | |
| 5,667,881 A * | 9/1997 | Rasmussen et al. | 442/179 |
| 5,683,646 A | 11/1997 | Reiling, Jr. | |
| 5,702,663 A | 12/1997 | Seemann | |
| 5,721,034 A | 2/1998 | Seemann, III et al. | |
| 5,759,325 A | 6/1998 | Davis | |
| 5,780,721 A | 7/1998 | Levens et al. | |
| 5,820,894 A | 10/1998 | Kreutzer | |
| 5,879,489 A | 3/1999 | Burns et al. | |
| 5,882,756 A | 3/1999 | Alston | |
| 5,904,972 A | 5/1999 | Tunis, III et al. | |
| 5,932,256 A | 8/1999 | Mandish | |
| 5,939,013 A | 8/1999 | Han et al. | |
| 5,954,898 A | 9/1999 | McKague | |
| 5,958,325 A | 9/1999 | Seemann, III et al. | |
| 6,090,335 A | 7/2000 | McClure et al. | |
| 6,096,164 A | 8/2000 | Benson et al. | |
| 6,206,067 B1 | 3/2001 | Kociemba et al. | |
| 6,211,497 B1 | 4/2001 | Matsen et al. | |
| 6,284,089 B1 | 9/2001 | Anderson et al. | |
| 6,298,896 B1 | 10/2001 | Sherrill et al. | |
| 6,299,819 B1 | 10/2001 | Han | |
| 6,355,203 B1 * | 3/2002 | Charmes et al. | 264/493 |
| 6,391,246 B2 | 5/2002 | Shiraishi et al. | |
| 6,391,436 B1 | 5/2002 | Xu et al. | |
| 6,406,659 B1 | 6/2002 | Lang et al. | |
| 6,408,517 B1 | 6/2002 | Lehmker et al. | |
| 6,461,551 B1 | 10/2002 | Mandish | |
| 6,510,977 B1 | 1/2003 | Hertz | |
| 6,533,985 B1 | 3/2003 | Smith | |
| 6,551,091 B1 | 4/2003 | Bryant et al. | |
| 6,575,218 B1 | 6/2003 | Burns et al. | |
| 6,579,418 B2 | 6/2003 | Lindsay et al. | |
| 6,589,472 B1 | 7/2003 | Benson et al. | |
| 6,638,466 B1 | 10/2003 | Abbott | |
| 6,689,438 B2 | 2/2004 | Kennedy et al. | |
| 6,692,681 B1 | 2/2004 | Lunde | |
| 6,696,690 B2 | 2/2004 | Benne | |
| 6,761,783 B2 | 7/2004 | Keller et al. | |
| 6,797,390 B2 | 9/2004 | Asai et al. | |
| 6,808,143 B2 | 10/2004 | Munk et al. | |
| 6,830,079 B1 | 12/2004 | Ahrens et al. | |
| 6,860,957 B2 | 3/2005 | Sana et al. | |
| 6,919,039 B2 | 7/2005 | Lang et al. | |
| 7,013,943 B2 * | 3/2006 | Sana et al. | 156/511 |
| 7,029,267 B2 | 4/2006 | Caron | |
| 7,127,950 B2 | 10/2006 | Fonov et al. | |
| 7,137,182 B2 * | 11/2006 | Nelson | 29/428 |
| 7,141,191 B2 | 11/2006 | Engwall et al. | |
| 7,186,367 B2 | 3/2007 | Hou et al. | |
| 7,228,611 B2 | 6/2007 | Anderson et al. | |
| 7,294,220 B2 | 11/2007 | Anderson | |
| 7,306,450 B2 | 12/2007 | Hanson | |
| 7,398,586 B2 | 7/2008 | Prichard et al. | |
| 7,398,698 B2 | 7/2008 | Griess | |
| 7,413,694 B2 | 8/2008 | Waldrop, III et al. | |
| 7,503,368 B2 | 3/2009 | Chapman et al. | |
| 7,521,105 B2 * | 4/2009 | Bech et al. | 428/60 |
| 7,527,759 B2 | 5/2009 | Lee et al. | |
| 7,534,615 B2 | 5/2009 | Havens | |
| 7,622,066 B2 | 11/2009 | Brustad et al. | |
| 7,624,488 B2 | 12/2009 | Lum et al. | |
| 7,628,879 B2 * | 12/2009 | Ackerman | 156/98 |
| 7,655,168 B2 | 2/2010 | Jones et al. | |
| 7,762,122 B2 | 7/2010 | Advani et al. | |
| 7,849,729 B2 | 12/2010 | Miller et al. | |
| 7,871,040 B2 | 1/2011 | Lee et al. | |
| 7,963,038 B2 | 6/2011 | Schmitz | |
| 7,964,049 B2 * | 6/2011 | Kapur et al. | 156/174 |
| 8,003,034 B2 | 8/2011 | Oldani et al. | |
| 8,114,673 B2 | 2/2012 | Mills et al. | |
| 8,409,396 B2 * | 4/2013 | Bech et al. | 156/304.5 |
| 2002/0060018 A1 | 5/2002 | Lindsay et al. | |
| 2003/0082321 A1 | 5/2003 | Kennedy et al. | |
| 2003/0175511 A1 | 9/2003 | Asai et al. | |
| 2004/0026025 A1 | 2/2004 | Sana et al. | |
| 2004/0031567 A1 | 2/2004 | Engelbart et al. | |
| 2004/0258562 A1 | 12/2004 | Mills et al. | |
| 2005/0086916 A1 | 4/2005 | Caron | |
| 2005/0102814 A1 | 5/2005 | Anderson et al. | |
| 2005/0112772 A1 | 5/2005 | Farone et al. | |
| 2005/0161154 A1 | 7/2005 | Anderson | |
| 2005/0230055 A1 | 10/2005 | Sana et al. | |
| 2005/0236735 A1 | 10/2005 | Oldani et al. | |
| 2005/0253309 A1 | 11/2005 | Hou et al. | |
| 2006/0108058 A1 | 5/2006 | Chapman et al. | |
| 2006/0118235 A1 | 6/2006 | Lum et al. | |
| 2006/0121613 A1 | 6/2006 | Havens | |
| 2007/0029527 A1 | 2/2007 | Mills et al. | |
| 2007/0107189 A1 | 5/2007 | Prichard et al. | |
| 2007/0272582 A1 | 11/2007 | Lau | |
| 2007/0289246 A1 | 12/2007 | Schmitz | |
| 2008/0023015 A1 * | 1/2008 | Arnold et al. | 128/899 |
| 2008/0111024 A1 | 5/2008 | Lee et al. | |
| 2008/0148817 A1 | 6/2008 | Miller et al. | |
| 2008/0308674 A1 * | 12/2008 | Frantz et al. | 244/118.5 |
| 2009/0120562 A1 * | 5/2009 | Tsotsis et al. | 156/148 |
| 2009/0145545 A1 | 6/2009 | Brennan et al. | |
| 2009/0148647 A1 | 6/2009 | Jones et al. | |
| 2009/0211698 A1 * | 8/2009 | McCowin | 156/250 |
| 2009/0273107 A1 | 11/2009 | Advani et al. | |
| 2009/0320292 A1 | 12/2009 | Brennan et al. | |
| 2010/0011580 A1 | 1/2010 | Brennan et al. | |
| 2010/0012260 A1 | 1/2010 | Brennan et al. | |
| 2010/0078126 A1 | 4/2010 | Brennan et al. | |

(56) References Cited

U.S. PATENT DOCUMENTS

| | | | |
|---|---|---|---|
| 2010/0170326 A1 | 7/2010 | Miller et al. | |
| 2011/0079174 A1 | 4/2011 | Miller et al. | |
| 2011/0259086 A1 | 10/2011 | Harris et al. | |
| 2011/0259515 A1 | 10/2011 | Rotter et al. | |
| 2013/0011586 A1* | 1/2013 | Landry et al. | 428/34.1 |

FOREIGN PATENT DOCUMENTS

| | | |
|---|---|---|
| EP | 0271263 A2 | 6/1988 |
| EP | 0319449 A2 | 6/1989 |
| EP | 0348831 A2 | 1/1990 |
| EP | 0391641 B1 | 8/1994 |
| EP | 0629497 A2 | 12/1994 |
| EP | 0816438 A2 | 1/1998 |
| EP | 1038656 A1 | 9/2000 |
| EP | 1780120 A2 | 5/2007 |
| EP | 1995044 A2 | 11/2008 |
| EP | 1995045 A2 | 11/2008 |
| EP | 2067611 A1 | 6/2009 |
| EP | 0391641 A3 | 7/2010 |
| EP | 2383106 A1 | 2/2011 |
| EP | 2383559 A1 | 4/2011 |
| EP | 2444240 A1 | 4/2012 |
| GB | 2478848 A | 9/2011 |
| JP | 60252235 A | 12/1985 |
| JP | 62259059 A | 11/1987 |
| JP | H06242087 A | 9/1994 |
| JP | 2002254429 A | 9/2002 |
| JP | 2004309379 A | 11/2004 |
| KR | 19970058260 | 11/1997 |
| WO | WO9322127 A1 | 11/1993 |
| WO | WO0176892 A1 | 10/2001 |
| WO | 02099416 A1 | 12/2002 |
| WO | 03021252 A1 | 3/2003 |
| WO | 2004031321 A1 | 4/2004 |
| WO | WO2004057120 A2 | 7/2004 |
| WO | 2005056391 A2 | 6/2005 |
| WO | 2005059500 A1 | 6/2005 |
| WO | WO2006118692 A1 | 9/2006 |
| WO | 2006110627 A1 | 10/2006 |
| WO | WO2008054499 A2 | 5/2008 |
| WO | 2008088435 A1 | 7/2008 |
| WO | PCT US2009/055378 | 8/2009 |
| WO | WO2010025376 A1 | 3/2010 |

OTHER PUBLICATIONS

USPTO Office Action dated May 20, 2011 for U.S. Appl. No. 11/751,931, pp. 31.
USPTO Final Office Action dated Aug. 11, 2010 for U.S. Appl. No. 11/751,931, pp. 29.
USPTO Final Office Action dated Sep. 28, 2011 for U.S. Appl. No. 11/751,931, pp. 24.
USPTO Office Action dated Apr. 13, 2011 for U.S. Appl. No. 11/751,928, pp. 19.
USPTO Office Action dated Jan. 19, 2012 for U.S. Appl. No. 11/751,928, pp. 13.
USPTO Final Office Action dated Jun. 23, 2011 for U.S. Appl. No. 11/751,928, pp. 11.
USPTO Office Action dated Oct. 26, 2010 for U.S. Appl. No. 11/952,222, pp. 21.
USPTO Office Action dated Oct. 3, 2011 for U.S. Appl. No. 11/952,222, pp. 23.
USPTO Final Office Action dated Apr. 15, 2011 for U.S. Appl. No. 11/952,222, pp. 20.
Response to Office Action dated Aug. 9, 2010 for U.S. Appl. No. 11/952,222, pp. 8.
Response to Office Action dated Jan. 21, 2011 for U.S. Appl. No. 11/952,222, pp. 25.
Response to Office Action dated Sep. 8, 2011 for U.S. Appl. No. 11/952,222, pp. 29.
Korea Patent Office Action dated Jun. 11, 2010 regarding Application 2008-47564 pp. 9.
Korea Patent Office Action dated Jun. 21, 2010 regarding Application 2008-47566 pp. 14.
European Search Report dated Mar. 13, 2009 regarding Application EP08171011, pp. 9.
EP Search Report dated Mar. 14, 2012 regarding Application EP12151305.5, applicant The Boeing Company, pp. 6.
Response to Office Action dated Feb. 3, 2012 regarding U.S. Appl. No. 11/952,222, pp. 40.
Amendment pursuant to request for continued examination dated Sep. 9, 2011 regarding U.S. Appl. No. 11/751,928, pp. 17.
Response to Office Action dated May 19, 2011 regarding U.S. Appl. No. 11/751,928, pp. 20.
Response to restriction requirement dated Feb. 21, 2011 regarding U.S. Appl. No. 11/751,928, pp. 11.
USPTO restriction/election requirement dated Jan. 12, 2011 regarding U.S. Appl. No. 11/751,928, pp. 5.
Amendment pursuant to request for continued examination dated Nov. 12, 2010 regarding U.S. Appl.No. 11/751,931, pp. 33.
Amendment pursuant to request for continued examination dated Mar. 28, 2012 regarding U.S. Appl. No. 11/751,931, pp. 21.
Examiner interview summary record dated Oct. 15, 2010 regarding U.S. Appl. No. 11/751,931, pp. 7.
Response to Office Action dated Jul. 20, 2010 regarding U.S. Appl. No. 11/751,931, pp. 9.
Response to Office Action dated Aug. 17, 2011 regarding U.S. Appl. No. 11/751,931, pp. 26.
Restriction/election requirement dated Mar. 19, 2010, regarding U.S. Appl. No. 11/751,931, pp. 7.
Response to restriction requirement dated Apr. 19, 2010 regarding U.S. Appl. No. 11/751,931, pp. 10.
Notice of Allowance, dated Sep. 21, 2012, regarding USPTO U.S. Appl. No. 12/725,380, 19 pages.
Notice of Allowance, dated Sep. 14, 2012, regarding USPTO U.S. Appl. No. 12/906,489, 34 pages.
Office Action, dated Oct. 24, 2012, regarding USPTO U.S. Appl. No. 11/952,222, 39 pages.
Final Office Action, dated Nov. 16, 2012, regarding USPTO U.S. Appl. No. 12/764,202, 31 pages.
Brennan et al., "Compaction of Prepreg Plies on Composite Laminate Structures," USPTO U.S. Appl. No. 13/657,137 and Preliminary Amendment, filed Oct. 22, 2012, 37 pages.
Buckingham et al., "Automating the manufacture of composite broadgoods," Composites, IPC Business Press Ltd., vol. 271, No. 3, Mar. 1996, pp. 191-200.
Jayaweera et al., "Adaptive robotic assembly of compliant aero-structure components," Robotics and Computer-Integrated Manufacturing, vol. 23, No. 2, pp. 180-194, Jan. 2007.
Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).
International Search Report dated May 29, 2008 regarding Application No. PCT/US2007/023455 (WO2008088435), 3 pages.
International Search Report dated Jul. 15, 2011 regarding Application No. GB1104472.4 (GB2478848), 5 pages.
European Search Report dated Sep. 15, 2011 regarding Application No. EP11160866 (EP2383106), 4 pages.
USPTO Office Action dated Mar. 10, 2010 regarding U.S. Appl. No. 11/829,900, 10 pages.
USPTO Notice of Allowance dated Jul. 30, 2010 regarding U.S. Appl. No. 11/829,900, 8 pages.
USPTO Office Action dated Feb. 21, 2012 regarding U.S. Appl. No. 12/906,489, 15 pages.
USPTO Final Office Action dated Apr. 30, 2012 regarding U.S. Appl. No. 11/952,222, 25 pages.
USPTO Office Action dated Jul. 27, 2010 regarding U.S. Appl. No. 12/242,477, 13 pages.
USPTO Final Office Action dated Dec. 2, 2010 regarding U.S. Appl. No. 12/242,477, 15 pages.
USPTO Office Action dated Nov. 14, 2011 regarding U.S. Appl. No. 12/768,007, 20 pages.

(56) References Cited

OTHER PUBLICATIONS

El Amin, "Nano ink indicates safety breach in food packaging," http://www.foodproductiondaily.com/Quality-Safety/Nano-ink-indicates-safety-breach-in-food-packaging, Nov. 14, 2006, 2 pages.

European Search Report, dated Sep. 30, 2011, regarding Application No. EP11160843 (EP2383559), 7 pages.

Lee et al., "Novel UV-Activated Colorimetric Oxygen Indicator," Chemistry of Materials, vol. 17, No. 10, May 2005, pp. 2744-2751. (Abstract).

Mills et al., "UV-Activated Luminescence/Colourimetric O2 Indicator," International Journal of Photoenergy, vol. 2008, 2008, 6 pages.

Setnescu et al., "Polymer Films Doped with Colorants as Oxygen Sensitive Materials," Journal of Optoelectrics and Advanced Materials, vol. 8, No. 2, Apr. 2006, pp. 682-686.

USPTO Final Office Action, dated Jun. 20, 2012, regarding U.S. Appl. No. 11/751,928, 20 pages.

USPTO Notice of Allowance, dated Jun. 13, 2012, regarding U.S. Appl. No. 12/906,489, 9 pages.

USPTO Office Action, dated Apr. 26, 2012, regarding U.S. Appl. No. 12/764,202, 13 pages.

USPTO Final Office Action, dated May 3, 2012, regarding U.S. Appl. No. 12/768,007, 29 pages.

USPTO Notice of Allowance, dated Jul. 5, 2012, regarding U.S. Appl. No. 12/242,477, 9 pages.

Miller et al., "Leak Detection in Vacuum Bags," USPTO U.S. Appl. No. 13/892,916, filed May 13, 2013, 48 pages.

Notice of Allowance, dated May 10, 2013, regarding USPTO U.S. Appl. No. 11/751,931, 49 pages.

Office Action, dated May 9, 2013, regarding USPTO U.S. Appl. No. 11/952,222, 27 pages.

Office Action, dated Mar. 26, 2013, regarding USPTO U.S. Appl. No. 13/657,137, 41 pages.

Office Action, dated Apr. 1, 2013, regarding USPTO U.S. Appl. No. 12/764,202, 38 pages.

Final Office Action, dated Aug. 15, 2013, regarding USPTO U.S. Appl. No. 12/764,202, 16 pages.

Material Safety Data Sheet for Potassium indigotetrasulfonate, Sigma-Aldric Corporation, Dec. 13, 2012, 6 pages.

\* cited by examiner

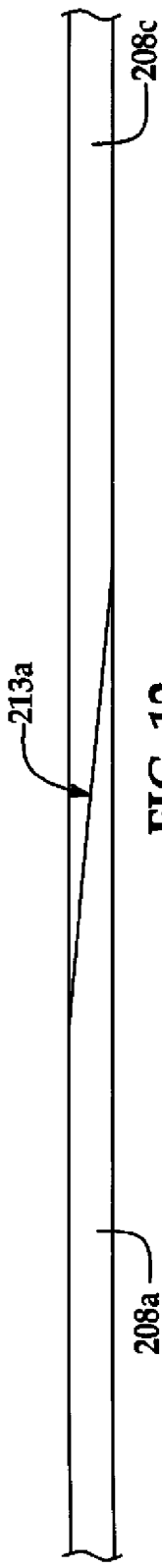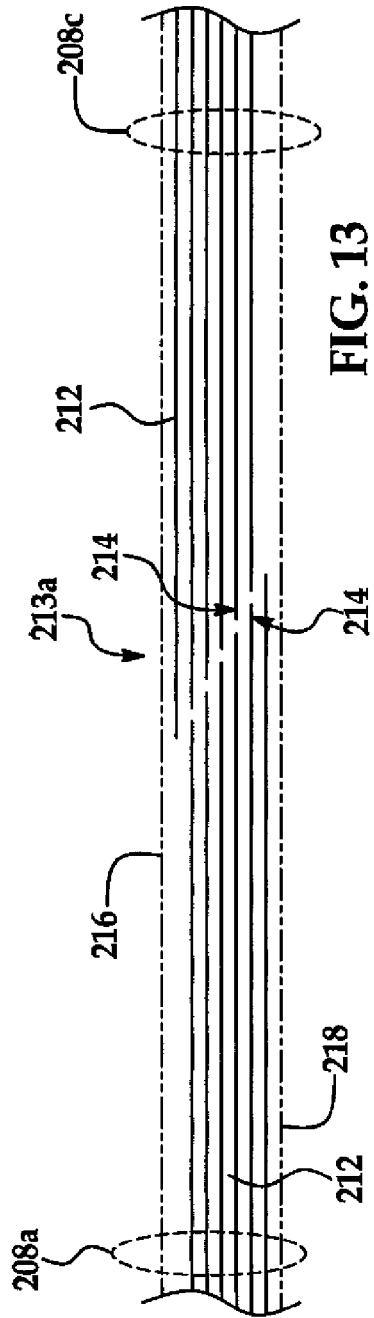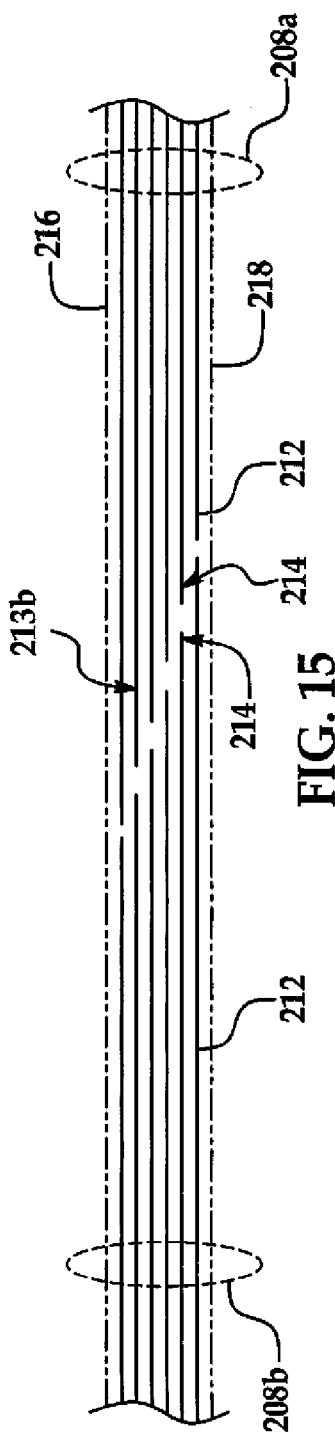

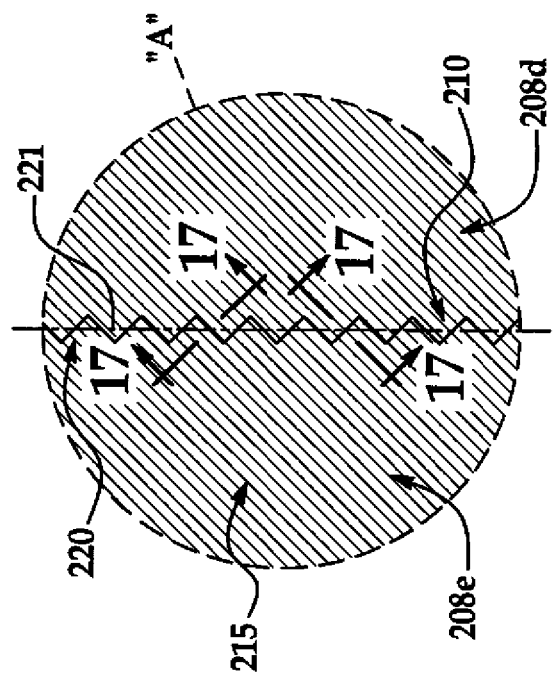
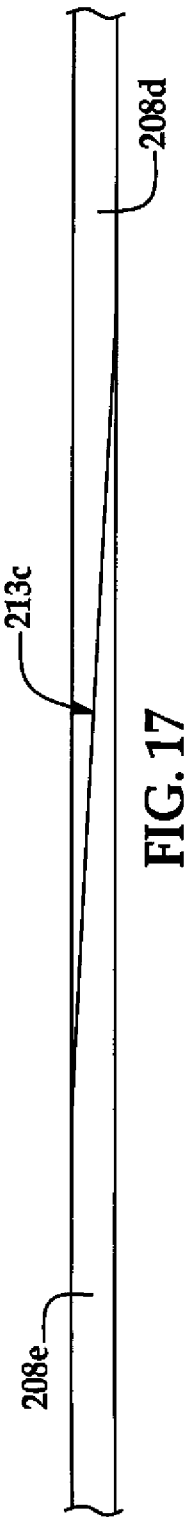
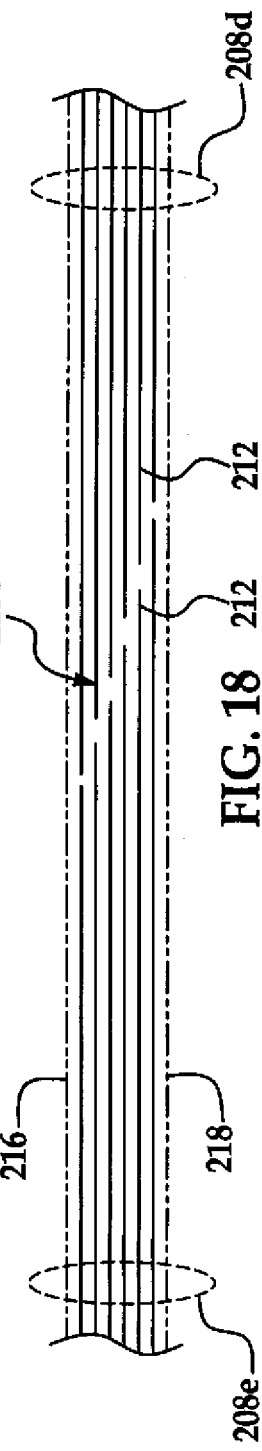
FIG. 16
FIG. 17
FIG. 18

METHOD OF FABRICATING STRUCTURES USING COMPOSITE MODULES AND STRUCTURES MADE THEREBY

RELATED APPLICATIONS

This application is a continuation-in-part of U.S. patent application Ser. No. 11/952,222 filed Dec. 7, 2007, and is related to U.S. patent application Ser. Nos. 11/751,928 and 11/751,931, both filed on May 22, 2007, the entire disclosures of all of which applications are incorporated by reference herein.

TECHNICAL FIELD

This disclosure generally relates to techniques for fabricating composite structures, and deals more particularly with a method of fabricating large scale composite structures by joining composite modules together.

BACKGROUND

Large scale composite structures such as aircraft fuselage skins, may be fabricated using advanced fiber placement (AFP) machines capable of laying down composite materials at relatively high rates. One way to achieve higher unit production rates may be achieved by providing greater numbers of AFP machines, however, the use of additional AFP machines may result in the need for significant capital investments in terms of machine cost, tooling and factory floor space.

Accordingly, a manufacturing method is needed that achieves relatively high production rates with relatively low capital investment and operating costs. There is also a need for a manufacturing method that is relatively flexible and relies on equipment that is less complicated than AFP machines.

SUMMARY

In accordance with the disclosed embodiments, a method is provided of fabricating composite structures, particularly large scale composite structures, that provides for higher production rates using lower cost equipment. Production time may be reduced by fabricating a large scale structure in modules that are individually fabricated and then joined together and co-cured. The individual modules of the structure may be fabricated in parallel using right-size equipment that, taken collectively, may be capable of higher material lay down rates compared to conventional AFP machines. The disclosed method also allows the use of equipment capable of handling multiple forms of materials that may be needed in order to satisfy load requirements in particular regions of the structure.

According to one disclosed embodiment, a method is provided of fabricating a composite structure, comprising: forming a plurality of composite modules each having an edge; and, joining the modules along their edges. The modules may be joined using a scarf joint between the edges of the modules which may include one or more overlapping ramps. Adjacent modules may be joined together by multiple scarf joints forming a crenellation pattern where the modules include unidirectional reinforcing fibers having orientations other than 0 or 90 degrees.

According to another disclosed method embodiment, fabricating a composite structure comprises: forming a plurality of multi-ply composite modules; assembling the composite modules together, including forming scarf joints between at least certain of the modules; and, co-curing the modules after the scarf joints have been formed. The scarf joints may be formed by abutting like-plies of adjacent modules or by overlapping the like-plies.

According to a further disclosed embodiment, a composite structure for aircraft comprises: a plurality of composite laminate modules each having edges; and, scarf joints for joining the modules along their edges. Each of the modules includes multiple plies. Like plies in adjoining ones of the modules may be either abutted or overlapped at the scarf joints. In one variation, the scarf joint may be a finger joint and the joints between certain of the adjoining modules may form a crenulated pattern.

The embodiments of the disclosure satisfy the need for a method of fabricating large scale composite structures using right-sized equipment representing a relatively low capital investment. The disclosed embodiments also satisfy the need for a fabrication method that is highly flexible and allows multiple modules of the structure to be formed in parallel.

BRIEF DESCRIPTION OF THE ILLUSTRATIONS

FIG. 12 is a cross sectional view taken along the line 12-12 in FIG. 10.

FIG. 13 is a schematic illustration showing the plies of the scarf joint shown in FIG. 12.

FIG. 14 is a cross sectional view taken along the line 14-14 in FIG. 10.

FIG. 15 is a schematic illustration showing the plies of the scarf joint of FIG. 14.

FIG. 16 is an enlarged illustration of the area designated as "A" in FIG. 10.

FIG. 17 is a cross sectional view of another scarf joint according to an alternate embodiment.

FIG. 18 is a schematic illustration showing the plies of the scarf joint of FIG. 17.

DETAILED DESCRIPTION

Figure 1:
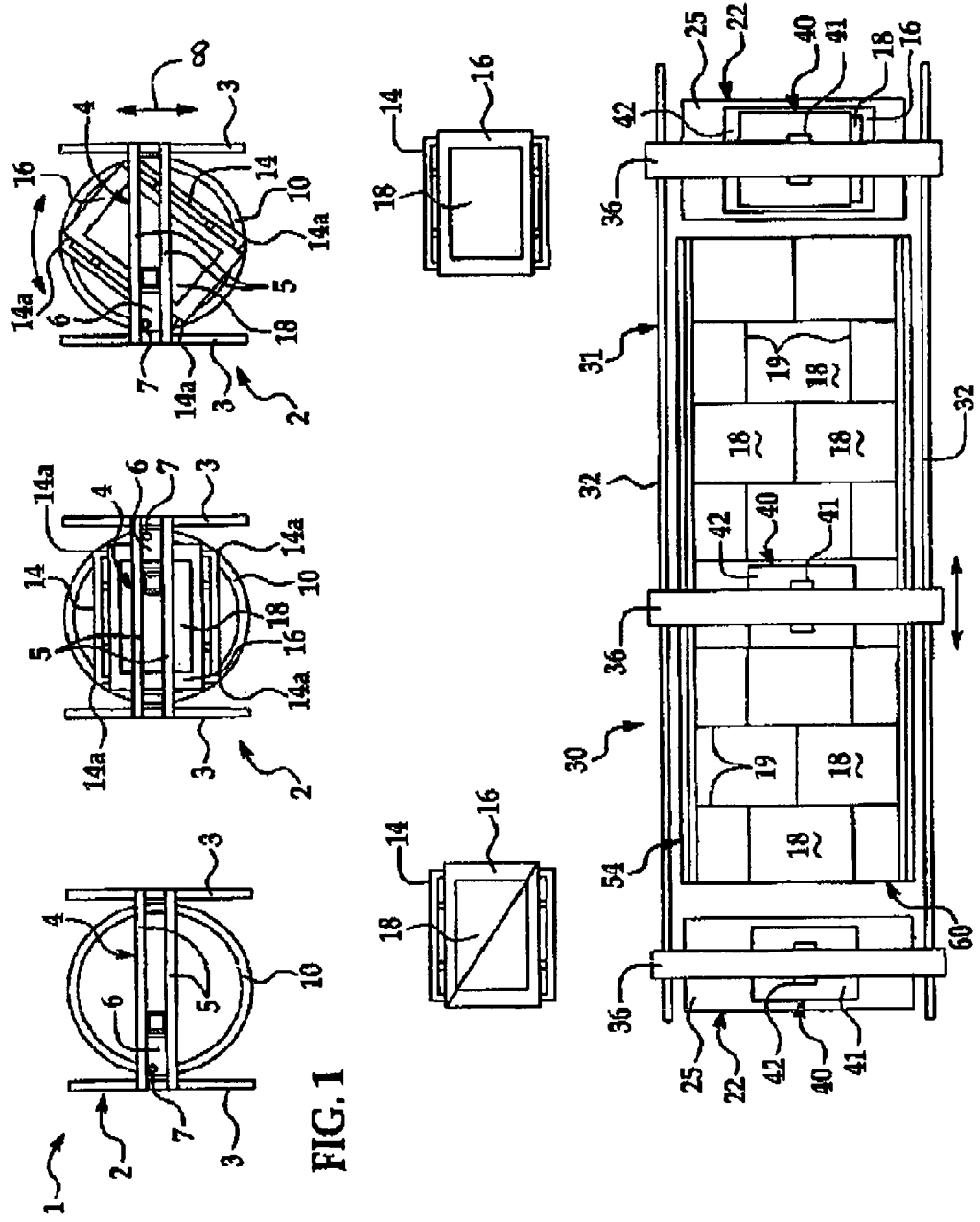
FIG. 1 is a schematic top view of a manufacturing system which is suitable for implementation of an illustrative embodiment of the modular composite fuselage skin manufacturing method.
Figure 2:
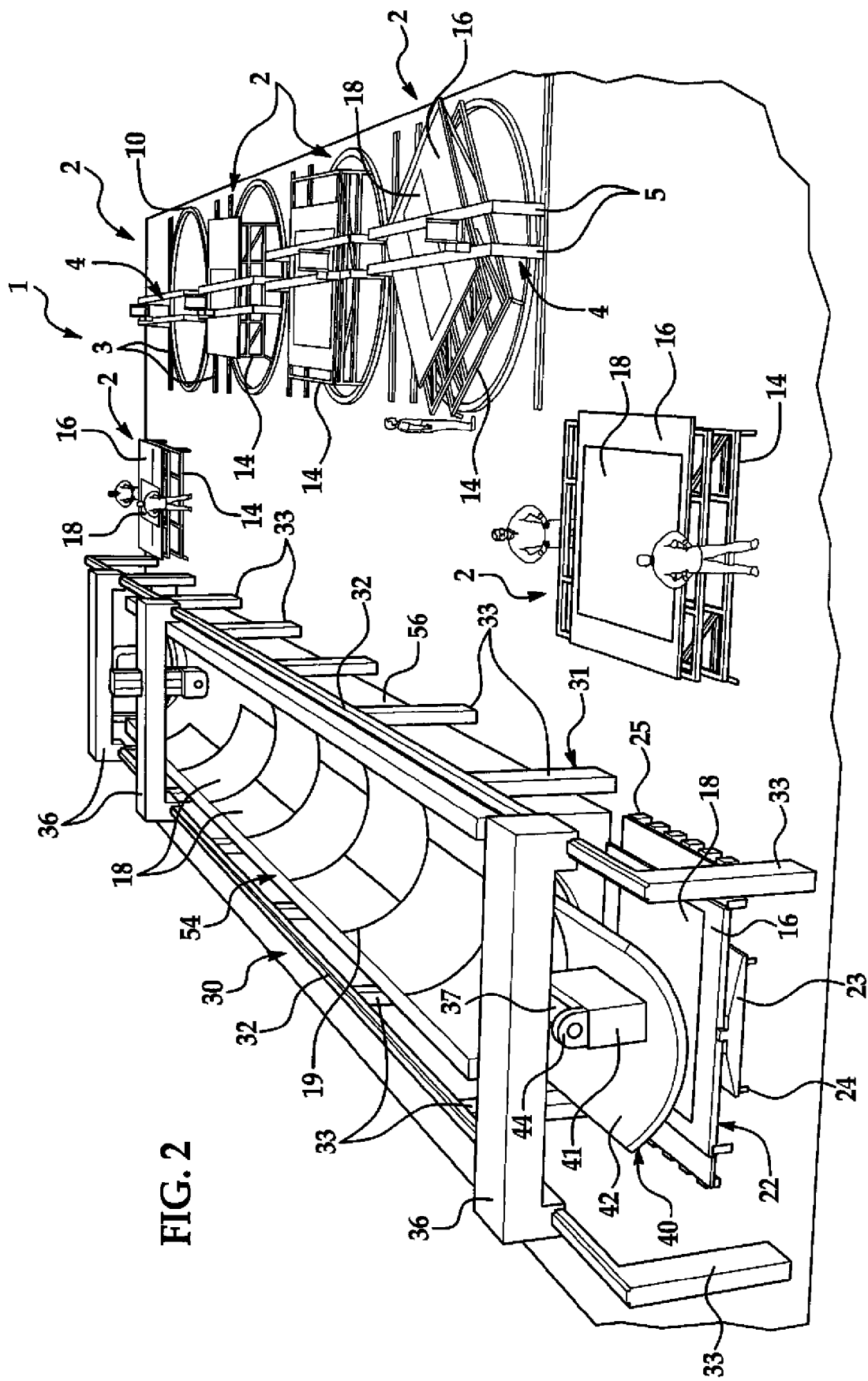
FIG. 2 is a perspective view of a manufacturing system which is suitable for implementation of an illustrative embodiment of the modular composite fuselage skin manufacturing method.
Figure 3:
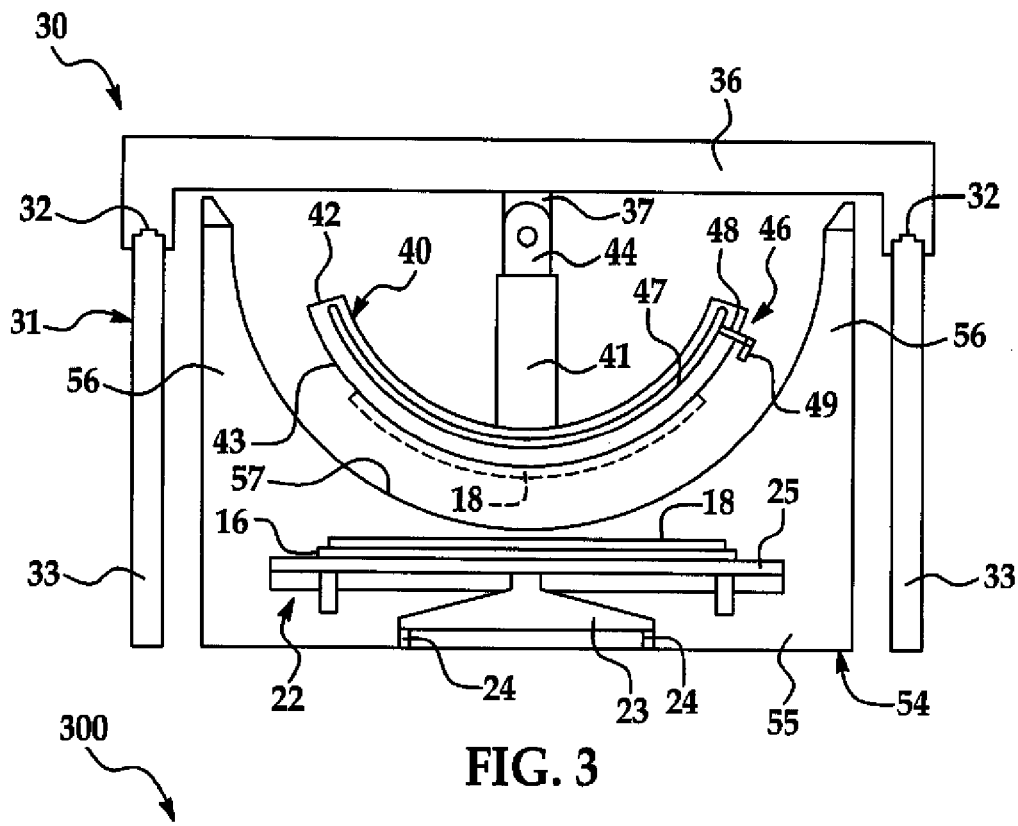
FIG. 3 is an end view of an SADL (semi-automated doubler locator) machine, a pick and place machine and a cure tool.

Referring initially to FIGS. 1-3 of the drawings, a manufacturing system which is suitable for implementation of an illustrative embodiment of the modular composite manufacturing method is generally indicated by reference numeral 1. The manufacturing system 1 is shown in top view in FIG. 1 and in perspective view in FIG. 2. The modular composite manufacturing method may utilize simple, right-sized equipment to enable lay down of composite materials in parallel processes rather than in series as part of the fabrication of composite aircraft fuselages or other parts. The use of a parallel process approach to the automated lamination of aircraft fuselage skin modules or other parts may dramatically reduce the flow time required to fabricate a single part. This may reduce the capital investment, factory floor space and support staff required to fabricate composite aircraft fuselage skins or other parts. Furthermore, the method may be used in the fabrication of flat-lay-up composite parts such as aircraft fuselage skins, for example and without limitation or contoured-lay-up composite parts such as aircraft wing skins and stabilizers for example and without limitation. The method may be used to fabricate panels, quarter sections, half fuselage sections, more than half fuselage sections or full barrel sections.

As shown in FIGS. 1 and 2, the manufacturing system 1 may include one or multiple flat tape lay-up machines (FTLMs) 2 to facilitate fabrication of flat-lay-up composite parts such as aircraft fuselage skins, for example and without limitation. Additionally or alternatively, the manufacturing system 1 may include one or multiple contour type lay-up machines (CTLMs) (not shown) to facilitate fabrication of contoured-lay-up composite parts such as aircraft wing skin, nose skin and/or tail skin, for example and without limitation. The FTLM and CTLM may have a design which is known to those skilled in the art. Although an exemplary structure and method of operation for the FTLM 2 will be hereinafter described, it will be recognized and understood that the same method of operation may be utilized with respect to one or more CTLMs in addition to or instead of the FTLMs 2.

Each FTLM 2 may include a pair of generally elongated, parallel, spaced-apart frame track rails 3. A carriage frame 4 may span and be adapted to bi-directionally traverse the frame track rails 3. The carriage frame 4 may include a pair of generally elongated, parallel, spaced-apart carriage frame members 5. The carriage frame members 5 may be oriented in generally perpendicular relationship with respect to the frame track rails 3.

A cutting carriage 6 may be adapted to bi-directionally traverse the carriage frame members 5 of the carriage frame 4. A carriage motor (not shown) may engage the cutting carriage 6 to facilitate movement of the cutting carriage 6 on the carriage frame 4. A cutting device 7 may be provided on the cutting carriage 6. In some embodiments, the cutting device 7 may be an ultrasonic knife, although alternative cutting implements which are known by those skilled in the art and suitable for the purpose may be used.

A transfer platform rotation track 10, which may be circular or annular, may be provided between the frame track rails 3 and beneath the carriage frame 4. A transfer platform 14 may be removably provided on the transfer platform rotation track 10. The transfer platform 14 may have a generally square shape. The corner portions 14a of the transfer platform 14 may slidably or rotatably engage the transfer platform rotation track 10 according to the knowledge of those skilled in the art such as through rollers (not shown), for example and without limitation. As will be hereinafter described, a carrier sheet 16 may be placed on the transfer platform 14. As used herein, "module" and "composite module" refer to composite material sections that are joined together to form a larger structure, and may be, but are not necessarily limited to single or multiply assemblies formed of pre-preg fiber tows or fabric. A composite module 18 may be placed on the carrier sheet 16. The transfer platform 14 may be rotated on the transfer platform rotation track 10, the carriage frame 4 may be moved along the frame track rails 3 and the cutting carriage 6 may be moved along the carriage frame members 5 of the carriage frame 4 to facilitate cutting of the composite module 18 along a selected axis or axes by operation of the cutting device 7.

As shown in FIGS. 1-3, the manufacturing system 1 may further include a SADL (Semi-Automated Doubler Locator) machine 22. The SADL machine 22 may include a pedestal 23 which may be rendered portable by multiple pedestal wheels 24. A module forming platform 25 may be provided on the pedestal 23. The module forming platform 25 may be adapted to receive and support a carrier sheet 16 on which is laid a composite module 18 for purposes which will be hereinafter described.

As further shown in FIGS. 1-3, the manufacturing system 1 may further include a pick and place machine 30. As shown in FIGS. 1 and 2, the pick and place machine 30 may be situated generally adjacent to the SADL machine 22. As further shown in FIG. 1, in some embodiments an SADL machine 22 may be provided at or generally adjacent to respective ends of the pick and place machine 30. The pick and place machine 30 may include a gantry 31 having a pair of generally elongated, parallel, spaced-apart rails 32. The rails 32 of the gantry 31 may each be supported by multiple, spaced-apart rail supports 33 as shown in FIG. 3. At least one placement head carriage 36 may span and slidably engage the rails 32 of the gantry 31. Each placement head carriage 36 may be adapted for bi-directional travel on the rails 32, as indicated by the double-headed arrow 8 in FIG. 1. A carriage motor (not shown) may engage each placement head carriage 36 to facilitate movement of the placement head carriage 36 on the rails 32.

As shown in FIGS. 2 and 3, a module placement head 40 may be suspended from each placement head carriage 36. The module placement head 40 may include a head shaft 41 and a generally curved or arcuate module engaging member 42. The head shaft 41 of the module placement head 40 may be attached to the placement head carriage 36 using any suitable technique which is known to those skilled in the art. In some embodiments, at least one head mount flange 37 extends from the placement head carriage 36. At least one module attachment bracket 44 extends from the head shaft 41. The module attachment bracket 44 may be connected to the at least one head mount flange 37 via a head fastening member 38.

As further shown in FIGS. 2 and 3, the module engaging member 42 of the module placement head 40 may include a generally convex module forming surface 43. A scanner 49 of an inspection scanner system 46 may be adapted to traverse the module forming surface 43 of the module engaging member 42. The scanner 49 may be attached to the module engaging member 42 according to the knowledge of those skilled in the art for the purpose. In some embodiments, a generally elongated, curved scanner slot 47 may be provided in the module engaging member 42 generally adjacent to and along the module forming surface 43. A scanner bracket 48 may engage the scanner slot 47 for traversing the scanner slot 47. The scanner 49 may be provided on the scanner bracket 48. A scanner motor (not shown) may engage the scanner bracket 48 to facilitate selective movement of the scanner bracket 48 in the scanner slot 47 and the scanner 49 along and adjacent to the module forming surface 43 of the module engaging member 42. An inspection analysis and control system (not shown) may be connected to the scanner motor (not shown) and the scanner 49 to facilitate the scanning motion of the scanner 49 and retrieve and analyze images received from the scanner 49.

The manufacturing system 1 may further include a cure tool, mandrel or mold 54. The cure tool 54 may be an OML (Outer Mold Line) or an IML (Inner Mold Line) cure tool, for example and without limitation. As shown in FIGS. 1, 2 and 3, the cure tool 54 may be situated generally adjacent to the SADL machine 22 and between the rails 32 of the pick and place machine 30. As shown in FIG. 3, in some embodiments the cure tool 54 may include a tool base 55 and generally parallel, spaced-apart tool sides 56 which extend from the tool base 55. A generally curved or semicircular module placement surface 57 may be provided in the tool base 55 and the tool sides 56 and may extend along the length of the cure tool 54. However, it will be recognized and understood that the cure tool 54 (such as in the case of IML cure tools, for example) need not necessarily have a full cylindrical or half-cylindrical cross-section as shown with respect to the module placement surface 57 of the cure tool 54. Under circumstances in which it is desired to utilize the manufacturing method on quarter panels, for example and without limitation, cure tools 54 having both an OML and an IML configuration could be used. Furthermore, the cure tool 54 may be configured as a wing or stabilizer mold, tool, cure tool or in any configuration depending on the part which is to be fabricated.

In typical implementation of the modular composite manufacturing method, the method may be used to fabricate an aircraft fuselage skin 60 (FIG. 1) using the multiple composite modules 18. Depending on the application and the part which is to be fabricated, each module 18 may include any combination of unidirectional carbon fiber prepreg; carbon fiber prepreg fabric; fiberglass; KEVLAR® poly(p-phenylene terephthalamide); or other materials. Each module 18 may have at least one ply. A carrier sheet 16, on which may be laid a composite module 18, may initially be placed on a transfer platform 14. The transfer platform 14 may be placed on the annular transfer platform rotation track 10 of a FTLM 2. The cutting device 7 on the cutting carriage 6 may be operated to trim or cut the composite module 18 to the desired dimensions and shape. During the trimming, cutting or modulating operation, the composite module 18 may be positioned at selected orientations with respect to the cutting device 7 by movement of the cutting carriage 6 along the carriage frame members 5 of the carriage frame 4; movement of the carriage frame 4 along the frame track rails 3; and/or rotation of the transfer platform 14 on the transfer platform rotation track 10. Each FTLM 2 may facilitate high-speed modulating of the composite modules 18 which are to form the aircraft fuselage skin 60 using net trim technology.

After trimming or cutting of the composite module 18 the transfer platform 14, on which is laid the carrier sheet 16 and the trimmed or cut composite module 18, may be removed from the transfer platform rotation track 10. The transfer platform 14 may be transported from the FTLM 2 to one of the SADL machines 22. Removal of the transfer platform 14 from the transfer platform rotation rack 10 and/or transportation of the transfer platform 14 may be automated or manual. At the SADL machine 22, the carrier sheet 16 may be removed from the transfer platform 14 and placed on the module forming platform 25 of the SADL machine 22. The carrier sheet 16 may be provided with multiple tooling/index openings (not shown) which may be indexed to the SADL machine 22 to facilitate proper positioning and placement of the carrier sheet 16 on the module forming platform 25.

The placement head carriage 36 may next be operated to slide along the rails 32 on the gantry 31 of the pick and place machine 30 to position the module engaging member 42 of the module placement head 40 directly over the composite module 18. The module forming platform 25 of the SADL machine 22 may then be raised against the module forming surface 43 of the module engaging member 42 to form or contour the flat composite module 18 to the generally convex contour of the module forming surface 43, as indicated in phantom in FIG. 3, through a module-compaction process. Forming and contouring of the module 18 to the module forming surface 43 of the module engaging member 42 may be automated. Additional composite modules 18 may be transported from the FTLM machine 2 to the module forming platform 25 of the SADL machine 22 and formed to the module forming surface 43 of the module engaging member 42 in a laminated or multi-ply manner as needed to achieve a desired thickness of the aircraft fuselage skin 60 (FIG. 1) Accordingly, successive composite modules 18 may be placed on each other to form a laminated module 18 having multiple plies. Depending on the application, the module placement head 40 may place continuous fiber plies or continuous fabric plies in conjunction with knitted plies of the composite modules 18. In some applications, adjacent modules 18 may be coupled to each other, as will be discussed later in more detail. It will be recognized and understood that the composite modules 18 need not always be formed onto the module forming surface 43 of the module engaging member 42 on the module placement head 40. In the case of an IML curing tool 54, the modules 18 may be formed directly onto the curing tool 54 or onto other skin plies using the SADL machine 22.

After the desired number of composite modules 18 has been staged on the module placement head 40 of the pick and place machine 30, the scanner 49 of the inspection scanner system 46 may be operated to traverse the module forming surface 43 of the module engaging member 43 for the purpose of inspecting the composite modules 18. Defective composite modules 18 may be removed from the module placement head 40 and replaced with non-defective composite modules 18. Inspection of the modules 18 on the module placement head 40 may be an automated process.

The placement head carriage 36 of the pick and place machine 30 may then be operated to traverse the rails 32 on the gantry 31 of the pick and place machine 30 and facilitate precision placement of the stacked, laminated, compressed and inspected composite modules 18 in the desired location on the module placement surface 57 (FIG. 3) of the cure tool 54. Additional stacked, laminated and compressed modules 18 may be formed in similar manner and placed in the desired locations on the module placement surface 57 to form the aircraft fuselage skin 60. Module edges 19 of adjacent modules 18 may be ramped and overlapped with a scarf (not shown) or ramped splice joint (not shown) until the aircraft fuselage skin 60 is completely laid up.

Figure 4:
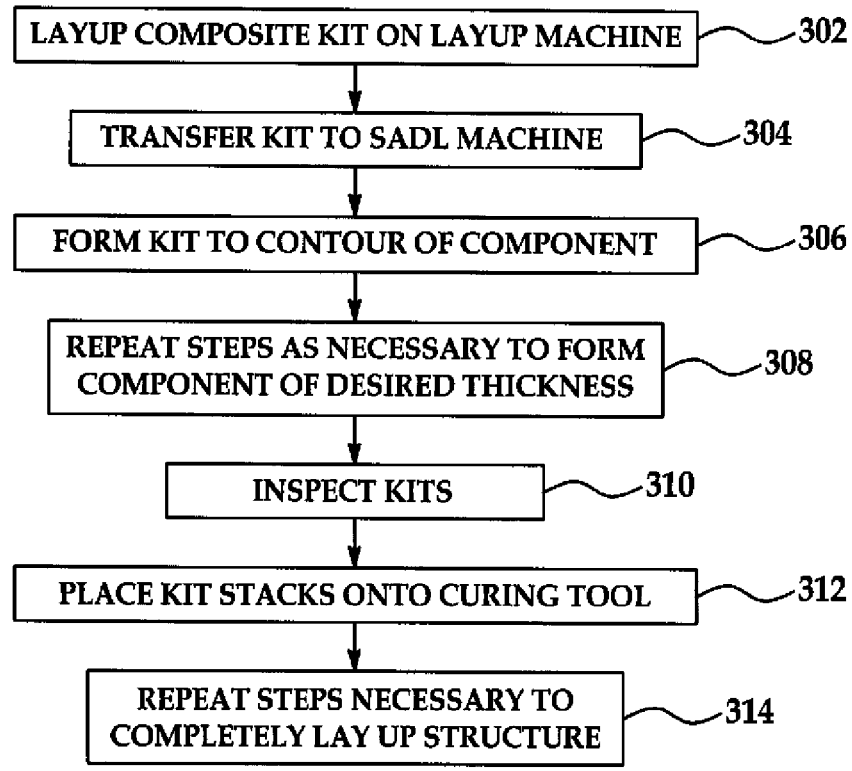
FIG. 4 is a flow diagram which summarizes an illustrative embodiment of the modular composite fuselage skin manufacturing method.

Referring next to the flow diagram 300 in FIG. 4, an illustrative embodiment of a modular composite manufacturing method is summarized. The method may be used to fabricate an aircraft fuselage skin having a desired thickness, for example and without limitation. In block 302, a composite module may be laid up. The module may be an aircraft fuselage skin module which may be used to fabricate a structure such as an aircraft fuselage skin, for example and without limitation, and may be laid up using an FTLM (Flat Tape Lay-up Machine), for example and without limitation. Additionally or alternatively, the module may be used to fabricate a structure such as an aircraft wing skin, nose skin or tail skin, for example and without limitation, in which case the module may be laid up using a CTLM (contour tape lay-up machine). In block 304, the module may be transferred to an SADL (Semi-Automated Doubler Locator) machine. In block 306, the module may be formed to the contour of an aircraft fuselage skin or other structure. In block 308, the steps carried out in blocks 302, 304 and 306 may be repeated to form a desired thickness of the aircraft fuselage skin or other structure. In block 310, the modules may be inspected. In block 312, the stacked or laminated modules may be stacked onto a curing tool. The curing tool may be an OML (Outer Mold Line) or IML (Inner Mold Line) curing tool, for example and without limitation. In block 314, the steps carried out in blocks 302, 304, 306, 308, 310 and 312 may be repeated as necessary to completely lay up the aircraft fuselage skin or other structure.

Figure 5:
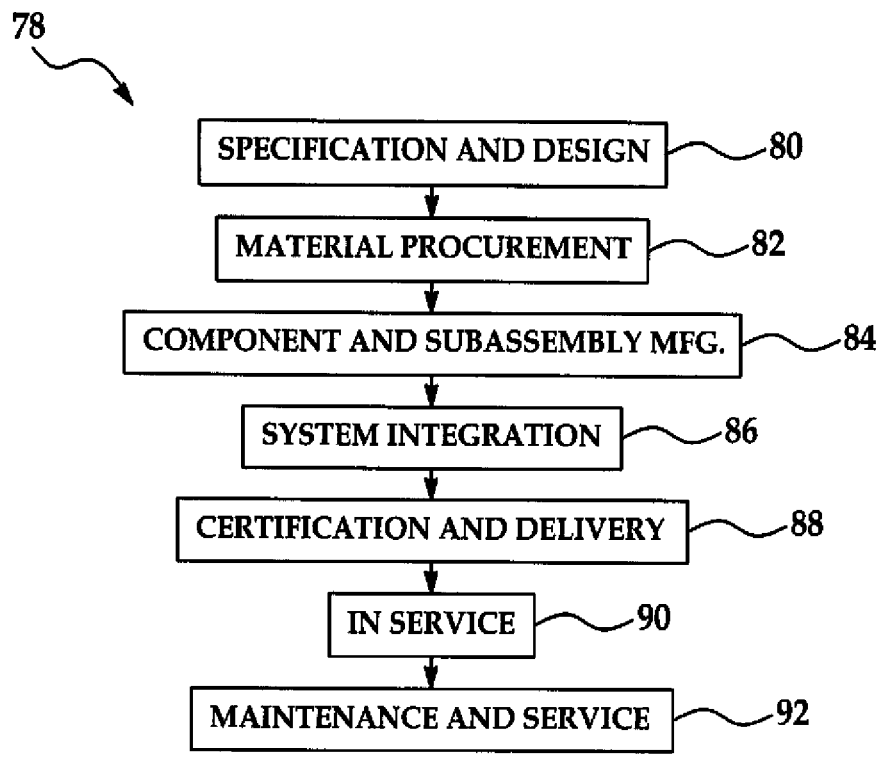
FIG. 5 is a flow diagram of an aircraft production and service methodology.
Figure 6:
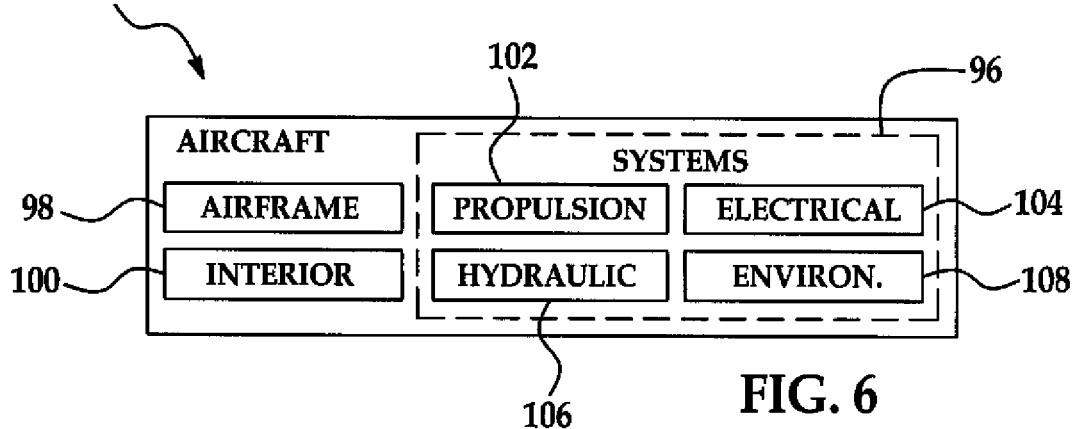
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Figure 9:
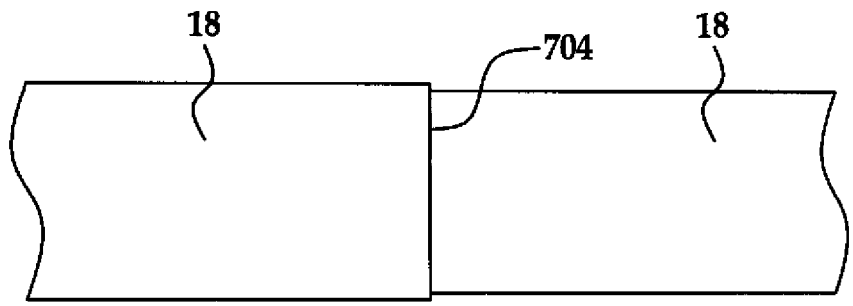
FIG. 9 is cross-sectional view of adjacently placed composite modules.

As previously mentioned, the modular composite manufacturing method may utilize right-sized equipment to enable lay up of composite materials in parallel processes rather than in series as part of the fabrication of composite aircraft fuselages or other parts. In this regard, reference is made to FIGS. 7 and 8. According to a number of embodiments, a method 700 of manufacturing a composite structure may include placing 702 a plurality of the modules 18 on the tool 54 such that each of the modules 18 is adjacent to at least another one of the modules 18, such as shown in FIG. 9 and such that adjacent modules 18 are bondable together, such as at a joint 704, to form a composite structure.

In some of the embodiments, more than one module 18 may be placed on the tool 54 at substantially the same time; in such embodiments, a plurality of the transfer platforms 14 may be provided. In addition, in forming the composite structure, the modules 18 may be placed on the tool 54 in a substantially sequential manner, with a post-placement procedure 706 being performed on one of the modules 18 that has already been placed on the tool 18 (as indicated by the notation n−2 in FIG. 8) while a subsequent module 18 is being placed on the tool 54 (as indicated by the notation n−1 in FIG. 8). In many embodiments, the placing step 702 and the post-placement process step 706 may be carried out while a subsequent module 18 is being prepped 708 for placement (as indicated by the notation n in FIG. 8).

Figure 7:
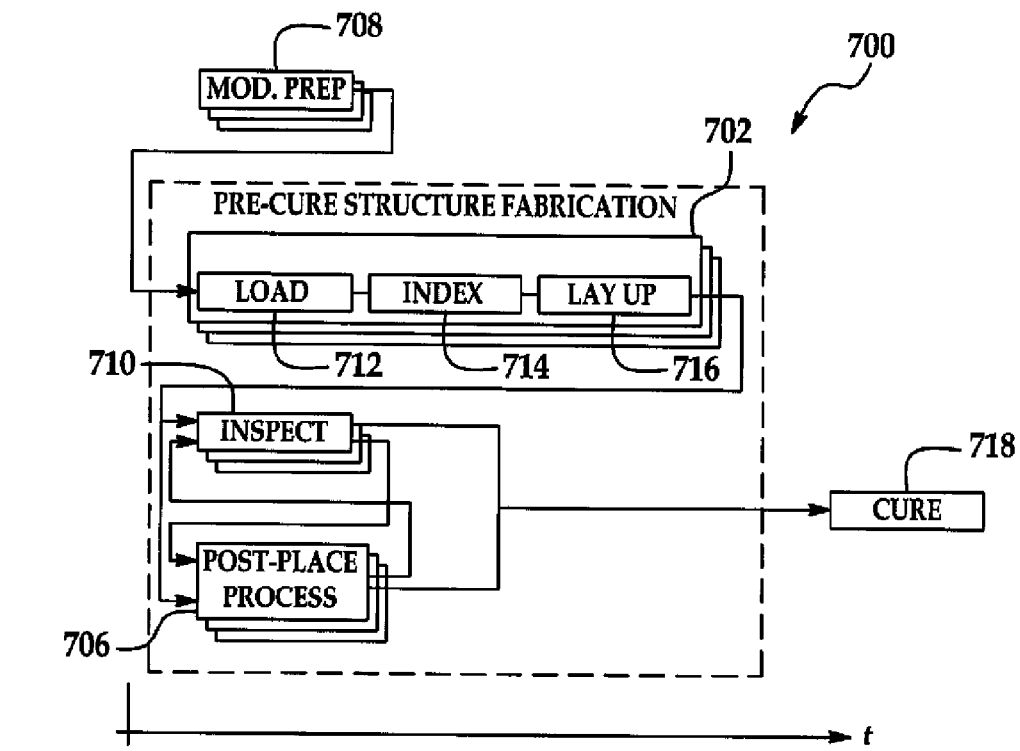
FIG. 7 is a flow diagram illustrating embodiments for manufacturing composite structures.
Figure 8:
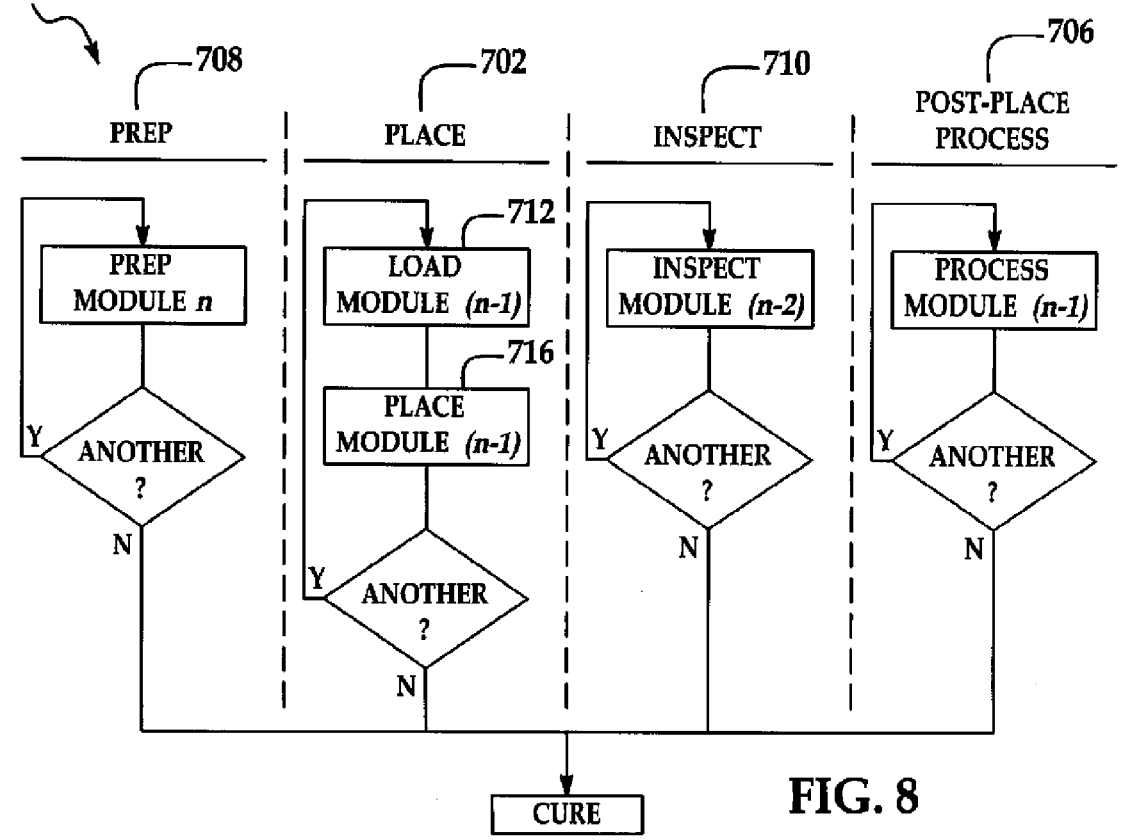
FIG. 8 illustrates additional embodiments for fabricating composite structures.

Regarding performing a post-placement procedure 706, this may include inspecting 710 one of the modules 18 that has already been placed on the tool 18 (as indicated by the notation n−2 in FIG. 8). The performing 706 of a post-placement procedure may also including working on the joint 704 formed between adjacent modules 18. In some of the embodiments such as shown in FIGS. 7 and 8, the fabrication method 700 may include performing, for example, the inspecting steps 710 and the post-placement process step 706 on different placed modules 18 at substantially the same time.

In many embodiments, the placing 702 of a module 18 on a tool 54 may include loading 712 a module 18 on a transfer platform 14, indexing 714 the loaded module into a proper position, and/or then laying up 716 the module onto a tool 54. After all of the modules 18 have been placed on the tool 54 and any subsequent post-placement process 706 has been carried out, then the structure may be cured.

Figure 10:
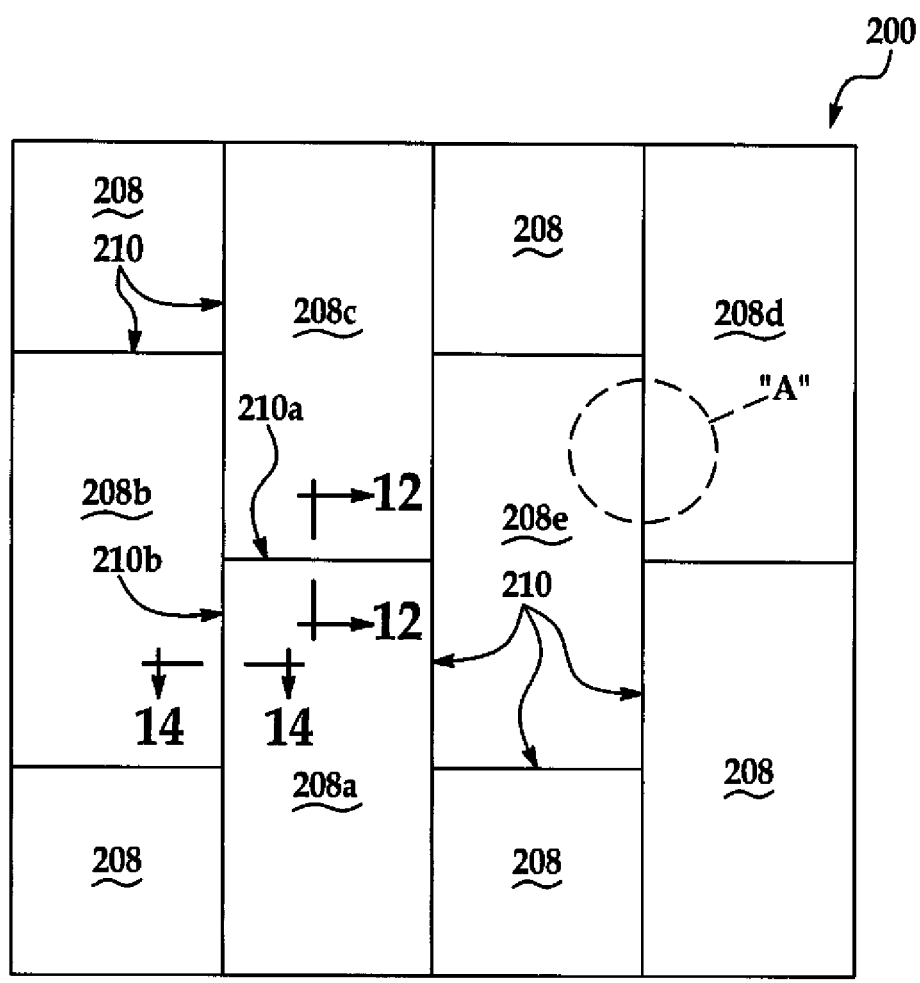
FIG. 10 is a plan view illustrating a subsection of an aircraft fuselage skin formed from multiple modules according to the disclosed embodiments.
Figure 11:
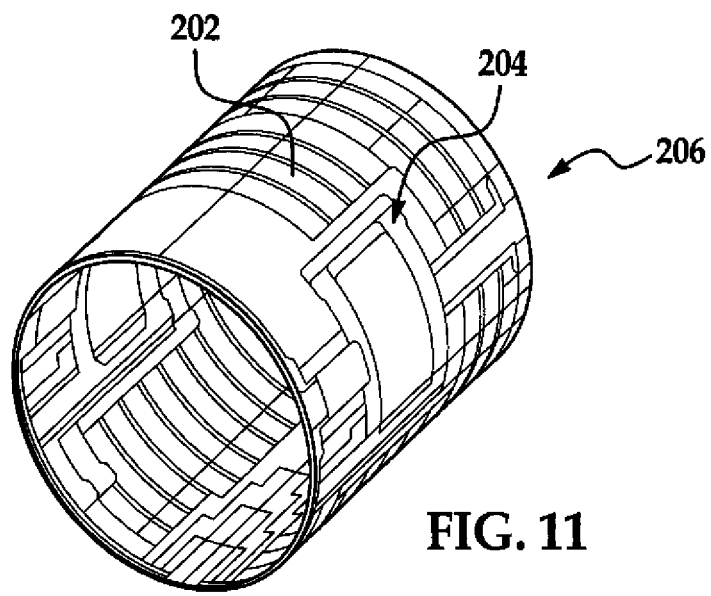
FIG. 11 is a perspective view of a fuselage section formed from subsections of the type illustrated in FIG. 10.

Referring now to FIGS. 10 and 11, composite modules 208 of the general type previously described may be joined together along their mutual edges 210 to form the skin 202 of a large scale structure such as a barrel shaped aircraft fuselage section 204. As will be described below in more detail, each of the modules 208 may comprise one or more laminated plies of composite material reinforced with unidirectional or bidirectional fibers and may include cutouts (not shown) and/or reinforcements (not shown) and/or profiles (not shown) used in forming features, such as a door 206 in the fuselage skin 202 shown in FIG. 11.

Referring now to FIGS. 12-15, adjacent ones of the modules 208 may be joined along their mutual edges 210 by scarf joints, examples of which are designated by the numerals 213a, 213b. As used herein, "scarf joint" refers to a joint between two pieces of material made by scarfing or beveling their ends, edges or sides so that when the parts are placed together they have overlapping edges forming one substantially continuous member. As shown in FIG. 13, each of two adjacent modules 208a, 208c joined by a scarf joint 213a may comprise multiple plies 212 of unidirectional or bidirectional preimpregnated fibers sandwiched between top and bottom facesheets 216, 218 respectively. Each of the facesheets 216, 218 may comprise cloth or other sheet materials. Scarf joint 213a is formed by laying up the plies 212 of the two modules 208a, 208c such that the outer ends 214 of like-plies of modules 208a, 208c overlap each other. Scarf joint 213a represents a simple scarf having a 40:1 ramp (i.e. run-to-rise ratio) comprising a total of 12 overlapping plies 212; other ramp ratios are possible, depending on the application A particular skin subsection 200 (FIG. 10) may comprise modules 208 joined together along their mutual edges 210 by more than one type of scarf joint 213, and indeed a particular module 208 may be joined along its edges 210 to adjacent modules 208 by different types of scarf joints. For example, one edge 210a of the module 208a shown in FIG. 10 may be joined to module 208c by the scarf joint 213a shown in FIGS. 12 and 13, while another edge 210b of module 208a may be joined to module 208b by another form of the scarf joint 213b shown in FIGS. 14 and 15. As shown in FIGS. 14 and 15, scarf joint 213b is a simple scarf configuration comprising 12 plies 212 arranged in an 80:1 ramp in which the outer edges 214 of like-plies 212 lie substantially in the same plane, and abut each other; other ramp ratios are possible, depending on the application.

Figure 19:
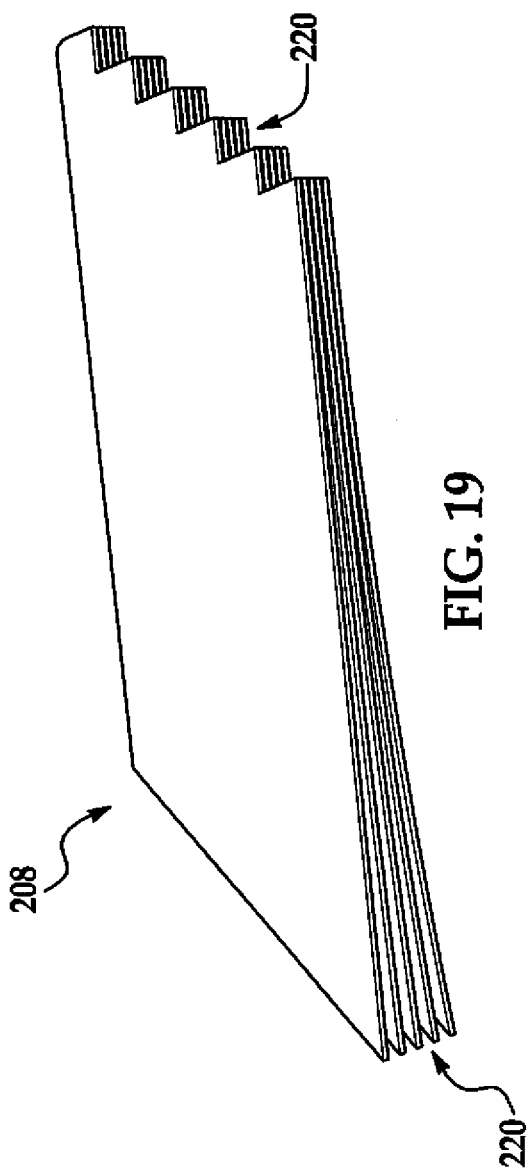
FIG. 19 is a perspective view of a composite module having crenulated edges.

Referring now to FIGS. 10 and 16-18, some of the modules 208 such as modules 208d and 208e may comprise plies 212 in which the orientation angle of the reinforcing fibers extends transverse to the edges 210. In the illustrated example, the orientation direction of the fibers is designated by the numeral 215 in FIG. 16 and comprises 45 degrees. In order to form a scarf joint 213c between the adjoining modules 208d and 208e, the edges 210 are formed as a zig-zag or crenulated pattern 220 that is symmetric about a joint axis 221 (FIG. 16). The crenulated pattern 220 is produced by scarfing the edges 210 of the modules 208d, 208e in two orthogonal directions. In the illustrated example, as best seen in FIG. 18, the scarf joint 213c comprises 12 plies 212 arranged in an 80:1 ramp in which like plies abut, rather than overlap each other. Ramp ratios other than 80:1 are possible, depending on the application. FIG. 19 illustrates a typical module 208 having crenulated edges 220 in which the crenulated patterns are offset from ply-to-ply.

Figure 20:
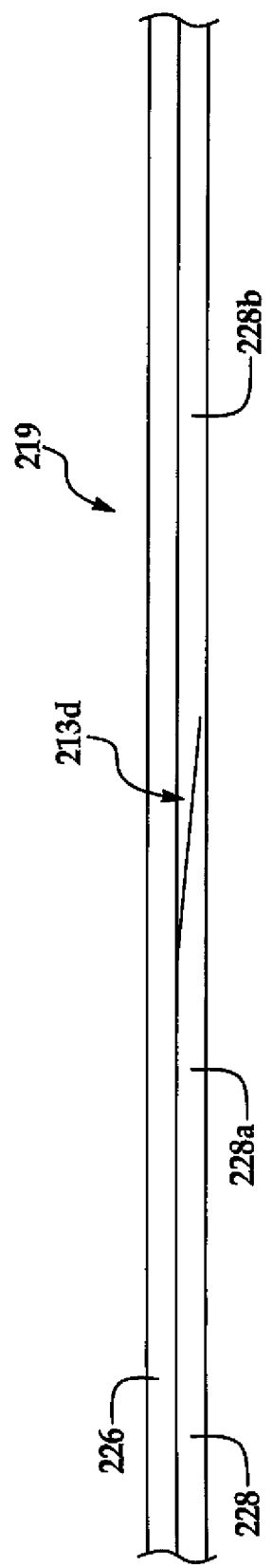
FIG. 20 is a cross sectional view showing a scarf joint forming another embodiment.
Figure 21:
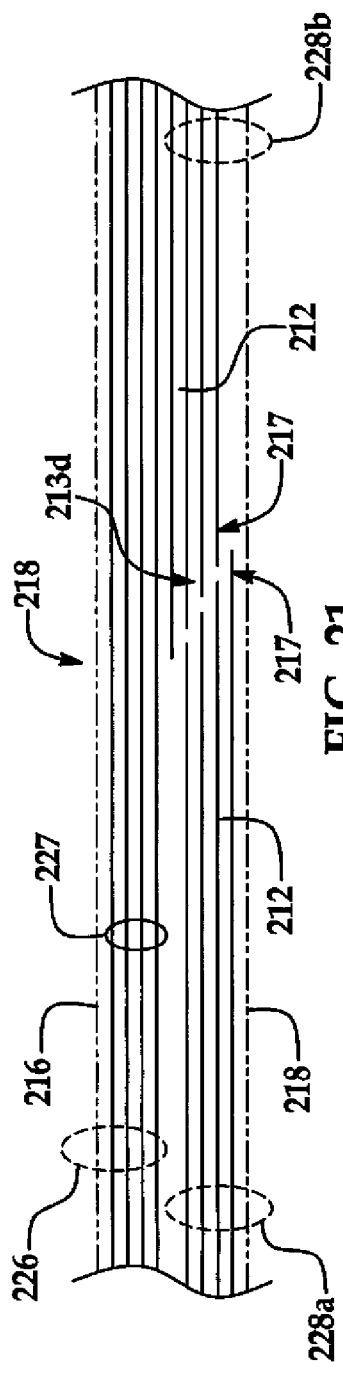
FIG. 21 is a schematic illustration showing the plies of the scarf joint of FIG. 20.

FIGS. 20 and 21 illustrate a module assembly 219 in which a scarf joint 213d is used to join two modules 228a, 228b, each formed of multiple plies 212 in which like-plies overlap at their edges 217. A third module 226 comprises multiple plies 227 that are placed over the scarf joint 213d. The embodiment of FIGS. 20 and 21 illustrates that the scarf joint 213d may be staggered across the subsection 200 (FIG. 10) and may not be continuous through the entire thickness of the subsection 200.

Figure 22:
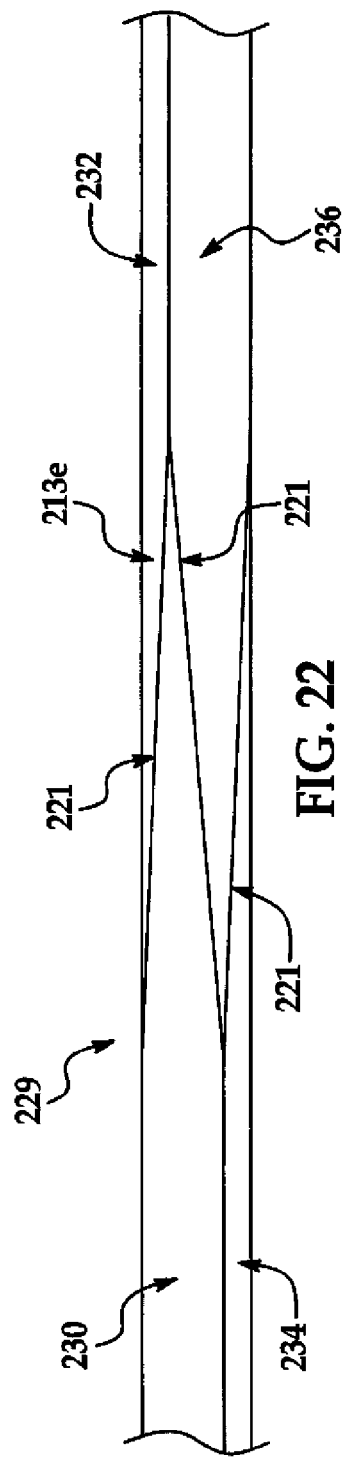
FIG. 22 is a cross sectional view illustrating another embodiment of the scarf joint.
Figure 23:
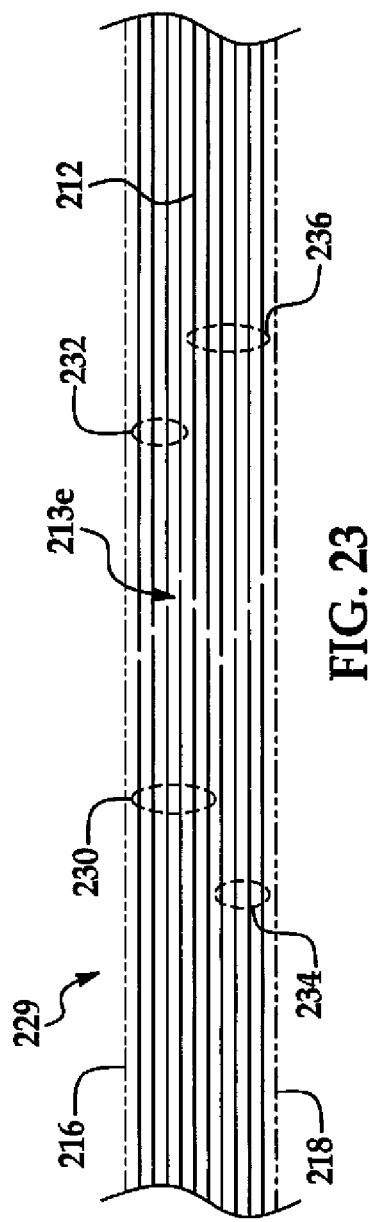
FIG. 23 is a schematic illustration showing the plies of the scarf joint of FIG. 22.

Attention is now directed to FIGS. 22 and 23 which illustrate another embodiment of a module assembly 229 that employs a finger joint type scarf joint 213e formed by multiple scarfs 221. The scarf joint 213e extends through the entire thickness of the module assembly 229 and joins multiple adjacent modules 230-236. In this example, the module assembly 229 comprises twelve plies 212 including top and bottom face sheets 216, 218, wherein each of the scarfs 221 possesses an 80:1 ramp; other ramp ratios are possible, depending on the application. Also in this example, like-plies 212 of the adjacent modules 230-236 abut, rather than overlap each other.

Figure 24:
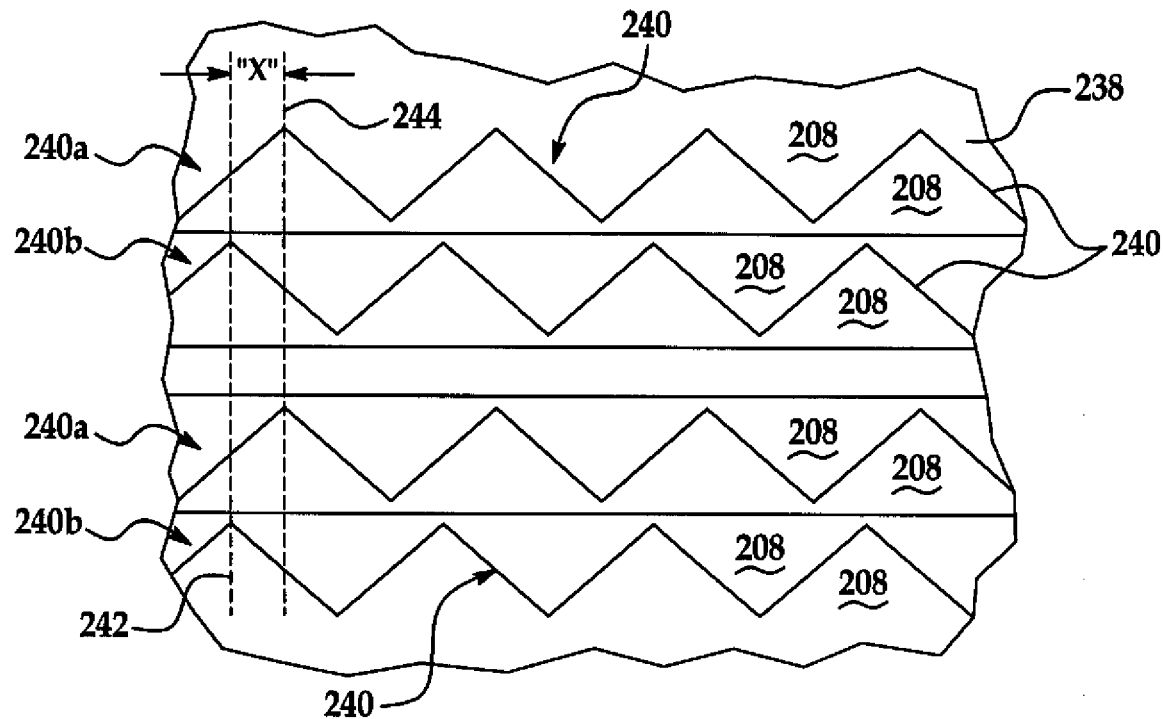
FIG. 24 is a plan view illustrating offsets between the crenulated joint edges between multiple modules.

Attention is now directed to FIG. 24 which illustrates a laminated structure 238 formed from multiple modules 208 that are joined together along scarf joints (not shown) forming crenulated patterns 240. In this example, the crenulated patterns 240 are arranged into two groups 240a, 240b. The crenulated patterns 240 are staggered relative to each other such that the phase of the two groups 240a, 240b is offset by a distance "x" so that adjacent ones of the crenulated patterns 240 may not be aligned with each other. This staggering of adjacent crenulated patterns 240 may enhance the structural properties of the laminated structure 238.

Figure 25:
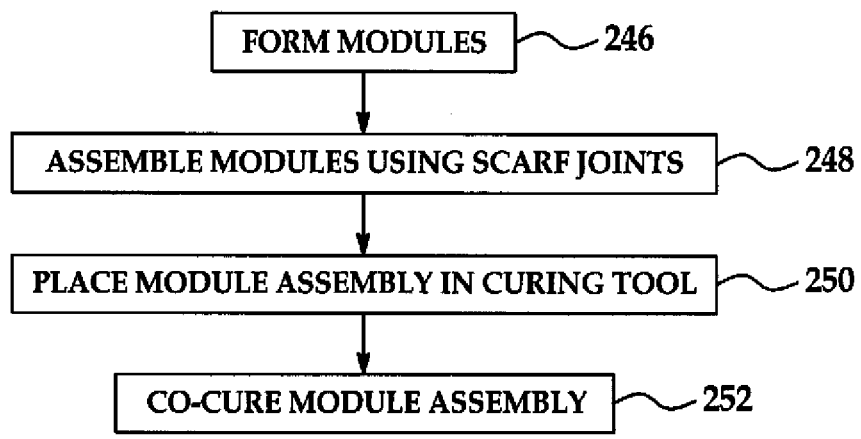
FIG. 25 is a flow diagram broadly illustrating the steps of a disclosed method embodiment.

Attention is now directed to FIG. 25 which summarizes the broad steps of a method for fabricating structures using the modules 208 previously described. Beginning at step 246, modules 208 are formed which may comprise single or multiple plies of composite material. Next at 248, the modules 208 are assembled using any of various types of the scarf joints 213 discussed above. Following assembly, the modules 208 may be placed on or in a curing tool at step 250 which may comprise an inside mold line or outside mold line cure tool. As previously described in connection with FIGS. 1-3, the modules 208 may be assembled by sequentially placing them on the cure tool or by assembling groups of the modules 20S then placing the groups on the cure tool. Finally, at step 252, the assembled modules 208 are co-cured in the cure tooling, resulting in the flow of resin through the scarf joints 213 to form a consolidated, substantially homogeneous structure.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite structure, comprising:
    forming a plurality of modules each having an edge, each of said modules comprising a plurality of adjacently stacked uncured composite pre-preg fibers, each of said plurality of modules being substantially planar;
    joining the plurality of modules together by joining respective edges of two adjacently positioned modules to form a scarf joint between said adjacently positioned modules, said respective edges are substantially co-planar, wherein an assembly is formed;
    after joining the plurality of modules to form the assembly, bending the assembly into a shape; and
    co-curing the assembly.

2. The method of claim 1, wherein the modules include prepreg fibers forming an angle of approximately 45 degrees with respect to an axis of orientation, and wherein:
    joining the plurality of modules together includes forming a scarf joint that defines a crenulated pattern along the respective edges of the modules.

3. The method of claim 1, wherein each of the plurality of modules includes at least two edges, and joining the plurality of modules together includes:
    forming at least two scarf joints between the plurality of modules respectively along the at least two edges of a given module, each of said two edges the given module adjacently positioned and joined to a respective edge of another module.

4. The method of claim 1, wherein each of the plurality of modules includes a plurality of plies, and joining the plurality of modules together along their edges includes:
    overlapping at least certain of the plies along the respective edge.

5. The method of claim 1, wherein each of the plurality of modules includes a plurality of plies, and joining the plurality of modules together along respective edge includes:
   substantially abutting at least certain of the piles along the respective edge.

6. A method of fabricating a composite structure, comprising:
   forming a plurality modules comprising substantially planar uncured multiple ply composite modules having a plurality of adjacently stacked uncured prepreg fibers;
   assembling the plurality of modules together, including forming scarf joints between at least certain of the plurality of modules, said scarf joints formed along adjacently positioned edges of respective modules, said edges being substantially co-planar;
   after assembling the plurality of modules to form an assembly, bending the assembly into a shape; and
   co-curing the plurality of modules after the scarf joints have been formed.

7. The method of claim 6, wherein forming scarf joints includes abutting at least certain plies of said adjacently positioned edges.

8. The method of claim 6, wherein forming scarf joints includes substantially overlapping at least certain plies of said adjacently positioned edges.

9. The method of claim 6, wherein:
   forming the plurality of modules includes laying up plies of fiber reinforced composite material having fiber orientations extending transverse to said adjacently positioned edges of the plurality of modules such that the edges form crenulated patterns, and
   assembling the plurality of modules includes fitting together the crenulated patterns of adjacent ones of the plurality of modules.

10. The method of claim 9, wherein assembling the plurality of modules includes staggering the plurality of modules relative to each other such that the crenulated patterns are offset relative to each other.

11. The method of claim 6, wherein assembling the plurality of modules together includes placing at least one of the plurality of modules over one of the scarf joints.

12. The method of claim 6, wherein assembling the plurality of modules includes positioning the plurality of modules relative to each other on a curing tool.

13. The method of claim 1 wherein the shape comprises at least part of a fuselage of an aircraft.

14. The method of claim 1, wherein joining the plurality of modules together includes forming a scarf joint that defines a crenulated pattern along the respective edges of the modules.

15. The method of claim 14 wherein the crenulated pattern comprises two groups of crenulated patterns.

16. The method of claim 15 wherein the two groups of crenulated patterns are staggered relative to each other such that a phase of the two groups is offset by a distance so that adjacent ones of the crenulated patterns are not aligned with each other.

17. The method of claim 6 wherein the shape comprises at least part of a fuselage of an aircraft.

18. The method of claim 6, wherein joining the assembling includes forming a scarf joint that defines a crenulated pattern along the respective edges of the modules.

19. The method of claim 18 wherein the emulated pattern comprises two groups of crenulated patterns.

20. The method of claim 19 wherein the two groups of crenulated patterns are staggered relative to each other such that a phase of the two groups is offset by a distance so that adjacent ones of the crenulated patterns are not aligned with each other.

* * * * *